US005663559A

United States Patent [19]
Auzerais et al.

[11] Patent Number: 5,663,559
[45] Date of Patent: Sep. 2, 1997

[54] MICROSCOPY IMAGING OF EARTH FORMATIONS

[75] Inventors: François M. Auzerais, Ridgefield; Robert L. Schroeder, Newtown, both of Conn.

[73] Assignee: Schlumberger Technology Corporation, Ridgefield, Conn.

[21] Appl. No.: 483,137

[22] Filed: Jun. 7, 1995

[51] Int. Cl.$^6$ .................................................. G01V 8/00
[52] U.S. Cl. .......................... 250/269.1; 250/256; 250/268
[58] Field of Search ........................... 250/269.1, 268, 250/256

[56] References Cited

U.S. PATENT DOCUMENTS

| | | | |
|---|---|---|---|
| 2,953,979 | 9/1960 | Rosene et al. | 95/11 |
| 4,696,903 | 9/1987 | Owen | 436/28 |
| 4,860,581 | 8/1989 | Zimmerman et al. | 73/155 |
| 4,994,671 | 2/1991 | Safinya et al. | 250/255 |
| 5,038,378 | 8/1991 | Chen | 382/1 |
| 5,134,471 | 7/1992 | Gendron et al. | 358/100 |
| 5,140,319 | 8/1992 | Riordan | 340/843.9 |
| 5,269,180 | 12/1993 | Dave et al. | 73/152 |
| 5,321,982 | 6/1994 | Fäy et al. | 73/151.5 |

OTHER PUBLICATIONS

Quinnell, Richard A., "Image Compression part 2", EDN, (Mar. '93), pp. 120–126 was cited in the specification and describes Moving Pictures Expert Group (MPEG), one of the standards for used for image compression.

Hung, Andy C., "PVRG–JPEG CODEC 1.1", Mar. 29, 1993 describes the Portable Research Video Group's (PVRG) software codec for still images, commercially available compression algorithms.

*Primary Examiner*—Constantine Hannaher
*Attorney, Agent, or Firm*—Leonard W. Pojunas; Keith G. W. Smith

[57] ABSTRACT

Images of rock formations below the earth's surface can be obtained on a microscopic scale. A borehole tool uses a seal to isolate an interval of the formation from borehole fluids which are outside the seal. A probe of the tool engages a wall of the formation and then draws formation fluid from the formation into the interior of the tool. The tool then produces an optical image of the formation which indicates rock texture. The seal can comprise a pad, inflatable packers, compressional packers, or cement plugs. The images of the formation can be obtained with electro-optic imagers such as charge-coupled devices (CCD) or a camera operating in the visible and/or near infrared range, or with ultrasonic transducers operating in the sub-MHz to mid GHz range, for example. The near infrared range provides an optical image of the formation through opaque fluids such as oil based muds or oil itself.

46 Claims, 9 Drawing Sheets

FIG.6a — RING OF LIGHT

1

MICROSCOPY IMAGING OF EARTH FORMATIONS

FIELD OF THE INVENTION

The invention concerns imaging earth formations. More specifically, the invention concerns imaging an interval of a rock formation below the earth's surface on a microscopic scale.

BACKGROUND OF THE INVENTION

Knowledge of rock texture is often crucial in characterizing a hydrocarbon reservoir in an Earth formation. Rock texture, meaning the shapes and sizes of grains, the matrix and pore structure, for example, greatly effect porosity and permeability of the formation. Until now, knowledge of rock texture has been obtained through labor intensive studies based on core analysis. This analysis involves taking core samples of the formation, bringing the samples to the surface, then cutting or thin-sectioning the samples for examination under optical microscopes.

Currently, micro-resistivity measurements can provide an image of a borehole wall. See U.S. Pat. No. 5,038,378 to Chen, for example. Also, optical spectroscopic analysis can provide information about the borehole wall. See U.S. Pat. No. 4,994,671 to Safinya et al. for example. Television and still cameras have been proposed for viewing boreholes through transparent slugs of fluid using visible or near infra red light. See U.S. Pat. No. 2,953,979 to Rosene et al. Video cameras have been proposed for producing an image of a borehole wall or casing. See U.S. Pat. No. 5,134,471 to Gendron at al. and U.S. Pat. No. 5,140,319 to Riordan, for example. There exists a need, however, for a technique for imaging the borehole wall of an earth formation at an improved spatial resolution to further characterize rock texture of the borehole wall through formation fluids such as filtrate water, mud, and oil.

SUMMARY OF THE INVENTION

The invention concerns a method and apparatus for imaging an interval of a rock formation below the earth's surface on a microscopic scale. In addition the invention concerns a method and apparatus for characterizing properties of an earth formation. The invention involves obtaining through formation fluids a first signal comprising a two-dimensional representation of a portion of a formation, wave energy having been reflected off the portion of the formation to produce the first signal; and characterizing a formation property based on the first signal.

According to one embodiment, the invention involves an apparatus and method involving a borehole tool for obtaining data concerning formation properties. The invention involves isolating an interval of the formation from borehole fluids; drawing formation fluid from the isolated interval of the formation; producing wave energy which reflects from the isolated interval and receiving the energy, and producing signals representative of a portion of the isolated interval of the formation. In another embodiment, the signal represents rock texture of the formation.

According to another embodiment, the invention concerns a downhole tool for obtaining data regarding formation properties. The tool comprises a sampling means having an inlet for providing fluid communication between the formation and the interior of the tool; a seal mounted adjacent the inlet to isolate an interval of the formation from borehole fluids located beyond the seal; and a pump for drawing fluid from the formation through the inlet of the sampling means; and a means for producing a signal comprising a two-dimensional representation of a portion of the isolated interval of the formation.

Another embodiment involves indicating a property of a formation. This involves producing substantially near infrared (NIR) light such that the NIR light passes through opaque formation fluid in a borehole to illuminate a surface in the borehole; receiving the NIR light which reflects from the surface in the borehole and through the opaque formation fluid; and producing a signal in response to the received NIR light, the signal comprising a two-dimensional representation of the surface in the borehole and indicating a property of the formation.

The seal can comprise the probe itself, or a pad which surrounds the probe and is forced against the borehole wall. Packers along the length of a borehole tool can also isolate an interval of the borehole wall. Such packers comprise inflatable packers, compressional packers, or cement plugs, etc., which, when placed in the borehole, isolate one interval of the formation from another. The formation intervals can be imaged with electro-optic, charge-coupled devices (CCD) or a camera operating in the visible and/or near infrared range, or with ultrasonic transducers operating in the sub-MHz to mid GHz range, for example. Furthermore, in coiled-tubing applications, production logging applications, or logging-while-drilling applications, a surface in a borehole, such as a borehole wall or casing, can be imaged through formation fluids such as gas, water, water filtrate, mud, or oil.

BRIEF DESCRIPTION OF THE FIGURES

FIGS. 6a–b show microscopic images of a berea rock surface.

DETAILED DESCRIPTION OF THE INVENTION

Generally, the immediately following text describes transporting fluids at a selected rate out of an earth formation through a probe and into a borehole tool, and then imaging a rock formation surface with an electro-optical device in the probe.

Figure 1A:
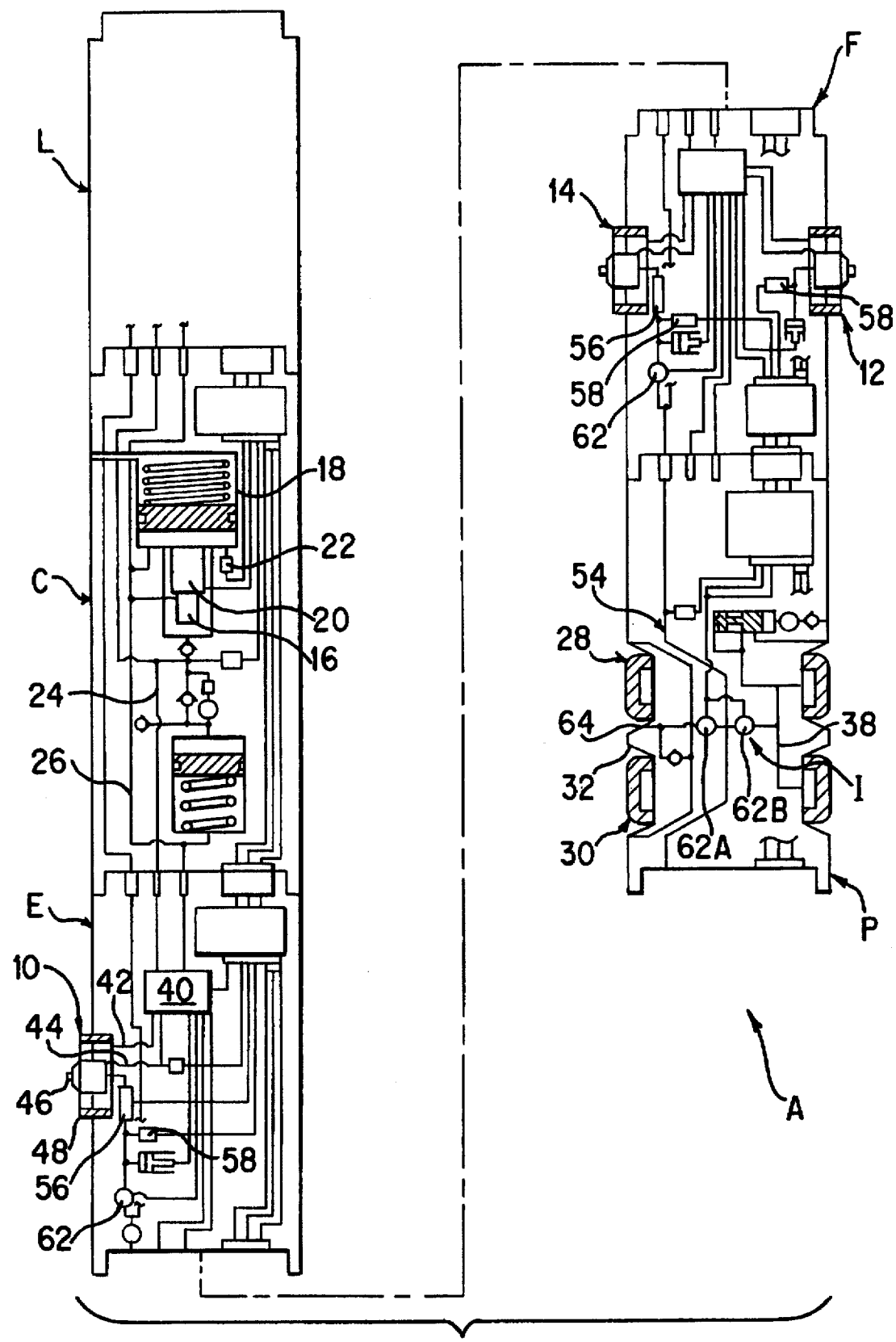
FIG. 1a–b shows a schematic drawing of a prior art borehole tool for extracting samples from an earth formation.
Figure 1B:
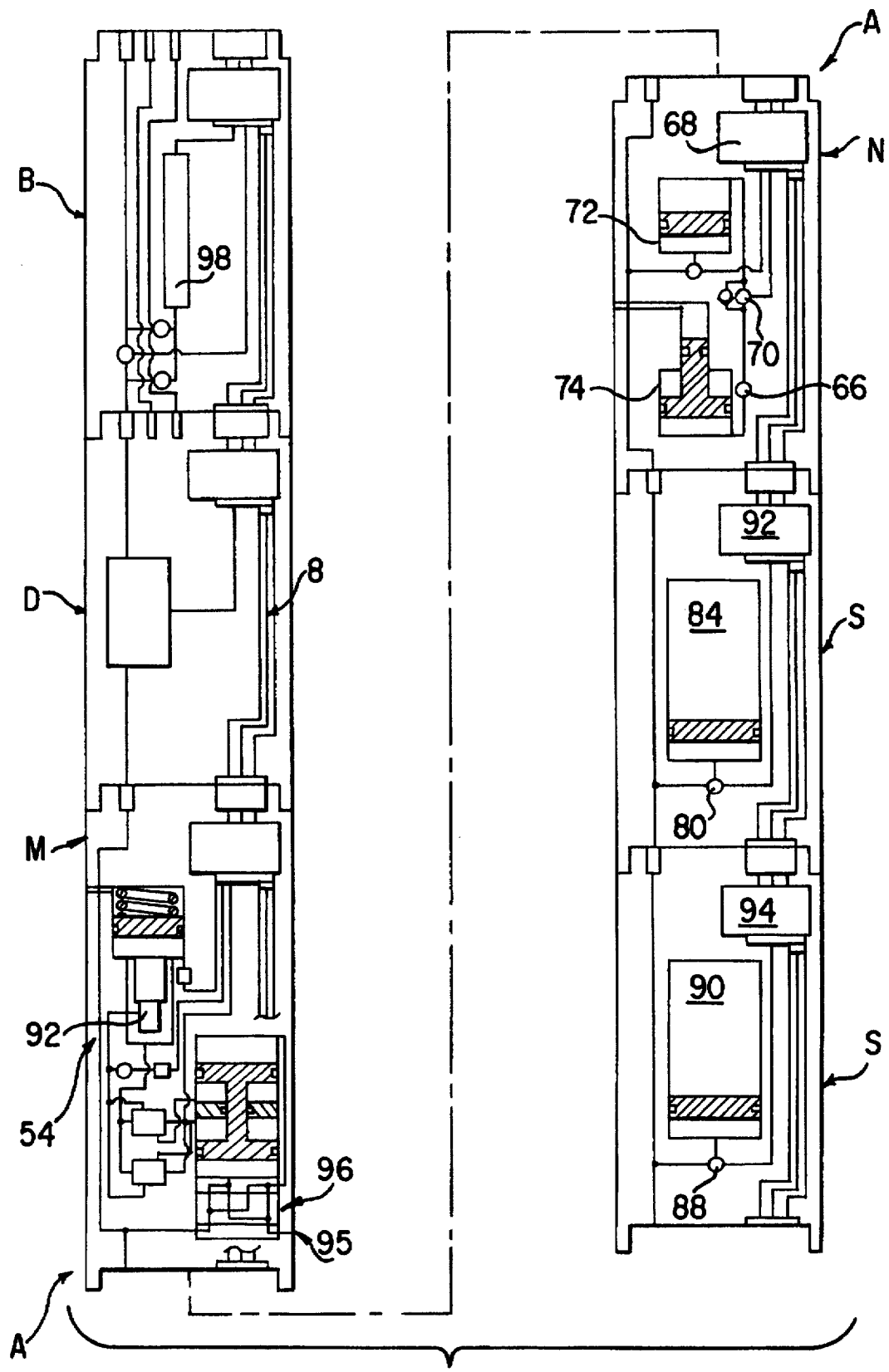

FIGS. 1a–b shows at A a schematic drawing of a borehole tool for extracting samples from an Earth formation and making pressure measurements useful in calculating formation permeability. As discussed in U.S. Pat. No. 4,860,581 to Zimmerman et al., such a borehole tool includes a hydraulic power module C, a packer module P and a probe module E. The hydraulic power module C includes a pump 16, reservoir 18, and a motor 20 and low-off switch 22 which connect to control the pump 16. A hydraulic fluid line 24 connects to the discharge of pump 16, runs through hydraulic power module C and into adjacent modules P and E (or F) to provide hydraulic power. Another hydraulic fluid line 26 extends from probe module E back to the hydraulic power module C and terminates at reservoir 18. A pump-out module M expels unwanted samples into the borehole by pumping a flow line 54, or to pump in fluid from the borehole to set or inflate straddle packers 28 and 30. The set straddle packers 28 and 30 hydraulically seal and isolate an interval of the formation from fluids which are present in the borehole beyond the packers 28 and 30. In this way, the borehole tool can examine formation fluids: those fluids found within the formation and beyond the borehole wall. Alternatively, hydraulic fluid from pump 16 can inflate or deflate the straddle packers 28 and 30. Straddle packers are described further in U.S. Pat. No. 4,860,581.

The probe module E has a probe assembly 10 for obtaining formation fluid samples to conduct isotropic permeability tests, for example. A probe actuator 40 selectively moves the probe assembly 10 relative to the borehole tool. A probe frame 46 is surrounded by a seal 48 which comprises a pad of compressed rubber, for example. The seal 48 is movable relative to the borehole tool A and the probe 46 is movable relative to the seal 48. As such, the seal 48 initially contacts the borehole wall. Extending seal 48 brings the probe 46 adjacent the borehole wall. To actually take a sample from the formation, it is necessary to insert the probe 46 into the formation, through mudcake covering the borehole wall. Accordingly, the borehole tool A operates so that, when the flow line 24 aligns with the flow line 44, the probe 46 moves relative to the seal 48 and protrudes into the formation. Probes 12 and 14 operate in a similar way.

A multiprobe module F can be added for anisitropic permeability and vertical reservoir tests, as discussed in U.S. Pat. No. 4,860,581 to Zimmerman et al. Pressure module B, fluid analysis module D, and flow control module N are discussed in detail in U.S. Pat. No. 4,860,581.

Having set packers 28 and 30 to isolate an interval of the formation, the probe 46 can be set to draw fluids from the earth formation. A sample flow line 54 extends from the outer periphery 32 between the packers 28 and 30, through adjacent modules and into sample modules. (see U.S. Pat. No. 4,860,581, for example). The vertical probe 46 and the sink probe 14 permit entry of formation fluids into the sample flow line 54. When taking initial samples, downhole optical spectroscopic analysis indicates that the first fluid drawn is visible because it is usually contaminated with mudcake and filtrate. The pumpout module M can be used to purge such initial samples.

According to this description, the borehole tool continues to draw formation fluid through the sample line 54. Subsequent samples change from the contaminated fluid to filtrate water, substantially, before again changing to produced oil. When the continuously drawn formation fluid is water, an image of the borehole wall can be produced using visible light. This image reveals the rock texture of the formation. Alternatively, even when the continuously drawn formation fluid is substantially off-based mud or oil itself, an image of the borehole wall can also be produced using near infrared radiation. This image also reveals the rock texture of the formation. Such images of the formation have a 5-micron resolution, approximately. Scales of textural features of rocks are on the order of 10 microns or lower. The images are converted to electronic signals for transmission up the borehole for display or for interpretation to characterize a formation property. Different devices for producing downhole images which indicate rock texture are described below.

Figure 2:
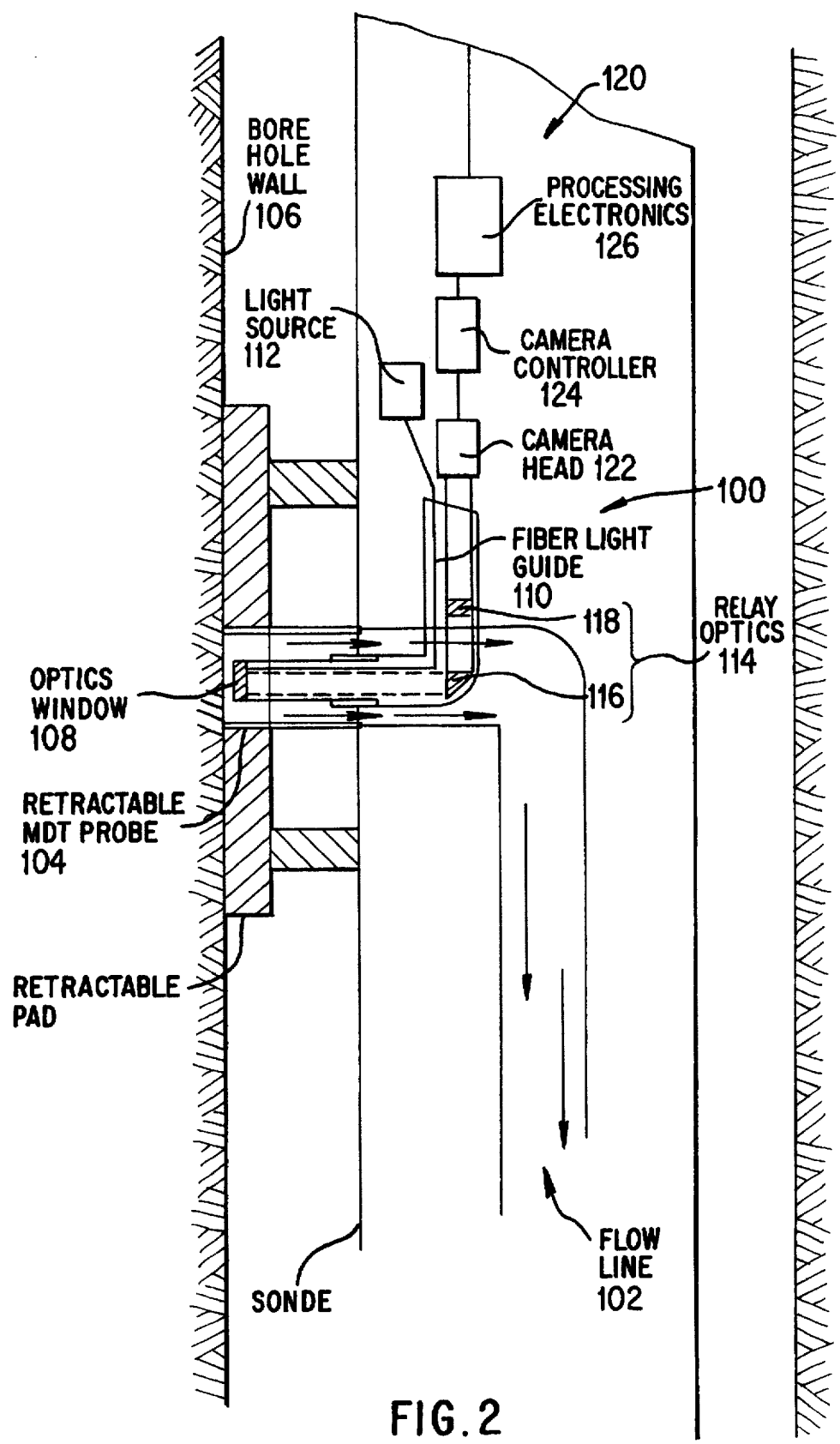
FIG. 2 shows a schematic of an apparatus for making representations of a borehole wall, which is carried by the tool of FIG. 1.

FIG. 2 shows a schematic of a microscopic imaging module 100 in borehole tool like A of FIG. 1. The probe module 10 of the tool A of FIG. 1 is modified to incorporate an optical imaging device within the probe module, which is part of the flow line 102.

The schematic shows a retractable probe 104 that makes a pressure seal with the borehole wall 106. Extended with the probe 104 is a retractable optics window 108 and fiber optic light guide 110. The fiber light guide 110 is connected to a light source 112 for illumination of the borehole wall 106. The light source 112 may be a tungsten halogen bulb or narrow band high intensity light emitting diode or laser that is matched to the responsivity of the camera detector. The light source may be a continuous or flash source. The optics window 108 is used as a view window and pressure seal for subsequent optics. The flow line 102 and optics path diverge into two paths. The flow line 102 continues for use in other tool modules. The optics path is linked to a camera, light source, and its associated electronics, described below.

Alternatively, the optical assembly of FIG. 2 can be assembled as part of the tool of U.S. Pat. No. 4,860,581 between two packers. Or, the optical assembly of FIG. 2 can be assembled as part of a borehole production tool, a coiled tubing system, or logging-while-drilling tool to directly view a borehole surface, such as a borehole wall or borehole casing through clear or opaque formation fluids present in the borehole. Such formation fluids include water, water filtrate, mud, oil, and/or gas. In production logging, the optical assembly can be sealed in a housing and lowered into a borehole by a cable or pushed through coiled tubing, for example. For coiled-tubing applications, the optical assembly can be sealed in a housing and pushed to an interval of a formation, between double packers (if needed) which isolate the interval of the formation. In logging-while-drilling applications, the optical assembly is mounted behind a window in a drill collar. A window in a drill collar is described in U.S. application Ser. No. 08/402,680 to Mullins, et al.

Relay optics 114 includes a lens system coupled with a coherent fiber optic bundle or may be constructed solely from lens optics. Shown in the schematic is a right angle prism 116 and a lens element 118 or elements (such as mirrors or other reflectors) that route the optical path by 90 degrees and magnify and relay the image of the borehole wall 106 to a camera 120. The lenses of the relay optics are chosen to provide a magnified image of the borehole wall to the camera's detector plane via the relay optics. This lens module has an adjustable zoom (magnification) and focus feature. The camera 120 comprises the camera head 122, a 2-dimensional (n×n pixels) detector in the camera head, camera controller, and processing electronics. The camera detector is either a silicon-based detector and/or InGaAs-based detector, sensitive in the NIR. The output of such a camera is a signal representative of a 2-dimensional image comprising, for example, a digital video output.

The camera has a camera controller that provides electrical and timing signals to the camera detector head. This module allows for the transfer of electronic signal from the n×n pixels that make up the camera detector to the image processing electronics. The camera controller comprises focus and zoom controls.

The processing electronics 126 modifies any image, or any signal comprising a two-dimensional representation of a formation interval, acquired by the camera head making it suitable to be transmitted uphole to standard data controllers and the wireline cable or transmits signals representative of a feature of the received formation interval. This device may perform functions such as removing background 2-D signals, correcting for uneven pixel (detector) responsivity or 2-D signals enhancement via signal processing techniques.

CCD

The electro-optic imager of FIG. 2 can comprise a charge-coupled device (CCD). CCD's rely on well-established semiconductor architecture comprising a metal oxide-silicon (MOS) capacitor. The capacitor consists of a silicon substrate, a thin layer of silicon dioxide, and a thin metal layer gate on the silcon dioxide layer. Such silicon based imagers transform an optical image, or a spatial distribution of radiation, into a time-distributed voltage signal. CCD's cover the visible band and the shorter wavelengths of the near infrared band (0.4 to 1.1 micron). Commercially available CCD's and frame grabber hardware, see the example, operate with little light and have enough dynamic range to provide a minimum of 256 shades of grey.

In addition to MOS-type CCD's, the electro-optic imager can comprise InGaAs-based devices or InGaAs-silicon-based devices in a 2-D array, as discusssed below.

The choice of electro-optic imager for operating in the visible light range depends upon the fluid covering the rock surface. For instance, in the case of a fractured surface of sandstone with a few millimeters of tinted mud filtrate between the imager's lens and surface of the rock, which may exist in the borehole when clear fluids, such as mud filtrate, are clouded by suspended sediments and flow into a formation testing probe. If the optical path between the rock formation and the detector is not clear, another possibility is to inject clear fluids into the formation as described in U.S. Pat. No. 5,269,180 to Dave et al. In both cases, the size and shape of each individual grain can easily be characterized from such a high contrast image.

VISIBLE/NEAR INFRARED

The electro-optic imager of FIG. 2 can comprise a camera operating in the visible/near infrared spectrum to image through opaque formation fluids.

To image rock samples in a borehole environment would involve imaging through opaque borehole fluids (water filtrate, light to heavy crude oils). We have tested a visible-near infrared (VIS-NIR) camera and have found that we can image through such opaque formation fluids. This technique requires a light source and a near IR detector operating at a suitable wavelength and resolution. The problems of mudcake removal through an open window in a continuous or stationary fashion is addressed below.

Figure 3:
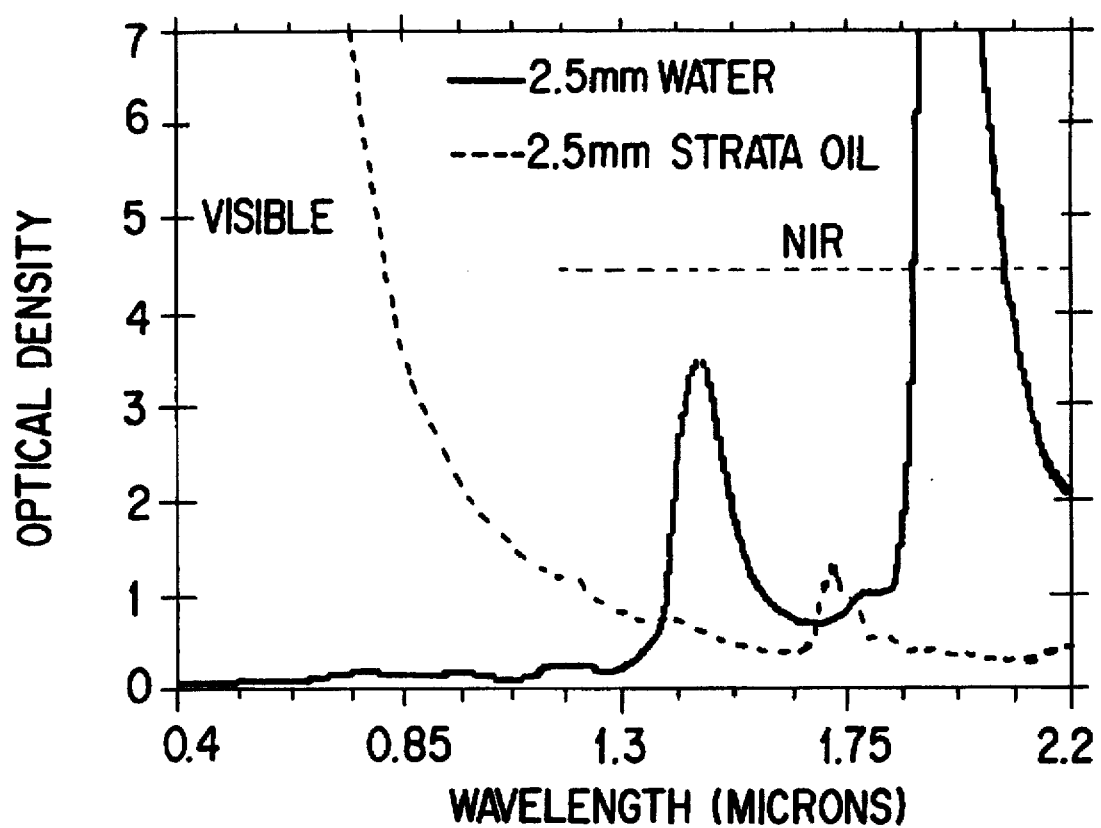
FIG. 3 shows the optical density spectrum of borehole fluid samples.

We first examined the transparency of borehole fluids by imaging through a separate 2.5 mm thick samples, one representative of a dark heavy crude oil (a Strata oil sample) and the other of clear water. FIG. 3 shows the optical density spectrum of these two samples. In the visible range, the representative dark heavy hydrocarbon has an optical attenuation greater than clear water by 6 orders of magnitude. In the NIR, oil has a small absorption peak near 1.7 microns, and the light absorption due to electronic transitions above 0.9 microns is not nearly as large as in the visible. Also in the near infrared, water has two rather large molecular absorption features near 1.4 and 2.0 mm, but is fairly transparent elsewhere. Therefore, both oil and water have windows of transparency that can be utilized so that the integrated light signal below 2.0 microns should provide enough light for a usable image. Alternatively, a high intensity light source in a narrow band in the NIR (laser or LED, for example) may be used. Experiments showed the feasibility of imaging through oil, as well as the limitations on the image contrast due to the presence of oil.

Figure 4A:
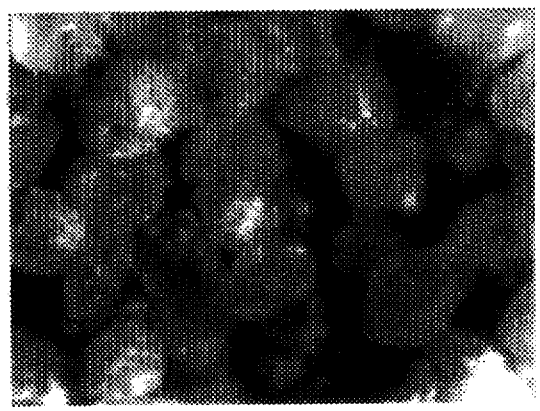
FIG. 4a and 4b shows digitized microscopic NIR images.
Figure 4B:
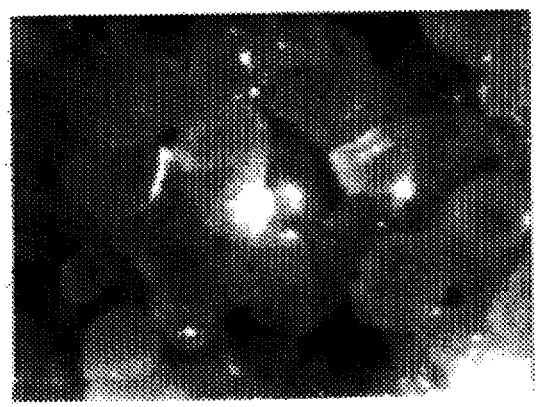

FIG. 4a shows) an image of an unpolished surface with no oil sample and visible light, and FIG. 4b an image of the same rock surface with NIR light through the same crude oil sample. FIG. 4b is the resulting digitized microscopic NIR image through a 2.5 mm sample of Strata oil. Comparable images taken in the visible spectrum produce no image at all. Although the oil acts as a filter, we illuminated the rock sample with NIR light between 1.0 micron and 2.0 microns, NIR is generally defined as 0.75 to 3.0 microns. The preferred range of NIR is generally above visible wavelengths to about 2.2 microns. The grain sizes for this sample are large, approximately 300 microns in diameter. For this application, spatial resolution is a trade off between magnification and field of view. For the relatively low magnification of this image, the high contrast image resolution, verified independently, is 12 microns. An image of similarly high quality was also captured through a 2.5 mm water sample. For reference, FIG. 4a shows the same rock imaged with visible light and no oil present. We see that the images in FIGS. 4a and 4b are remarkably alike. We can, therefore, draw the conclusion that the opacity of borehole fluid will not degrade imaging in the NIR.

For wireline application, a new indium gallium arsenide (InGaAs) detector 2-D array offers silicon performance, but for infrared applications where near-infrared detection had been made with detectors of lead sulfide (PbS), germanium (Ge), or indium antimonide (InSb). The advantage of InGaAs stems from its direct energy bandgap structure and its tunable alloy composition which covers the spectral range of 0.9 to 1.7 microns. An InGaAs detector yields the largest integrated signal over a wide range of fluid color and best handles color contrast between oil and water at large standoffs. This detector does not have the drawback of PbS arrays with their slow speed or photodiode arrays such as InSb which required cryogenic cooling and were quite expensive. With its speed, temperature and sensitivity advantages and an expected drop in costs, a InGaAs 2-dimensional array could be used for imaging of near-infrared wavelengths of light in an open hole environment. Also, InGaAs layered over silicon will yield a visible-near infrared (VIS-NIR) detector. The NIR portion of silicon alone will yield a detector suitable for less opaque formation fluids.

ULTRASONIC

The electro-optic imager of FIG. 2 can comprise a scanning acoustic microscopy imager, such as an ultrasonic imager, for example. Scanning acoustic microscopy is a high resolution imaging technique for characterizing surface and subsurface elastic properties of an object under examination. Mechanical motion drives a focused acoustic transducer perpendicular to the surface of the object. The scanning acoustic device is in a reflection mode. That is, a short pulse excites the transducer and multiple echoes in the system are time-separated. The arrival time of the echo indicates distance of the corresponding reflector from the acoustic transducer. The magnitude of the first return echo provides an estimate of the reflectivity of the object. Data acquisition is conducted continuously while the scanner is in continuous motion. Scanning over an object builds up an image representing the reflectivity of the object, point by point.

Acoustic microscopy can span sub-MHz to the mid-GHz range, employing a variety of coupling fluids. For low GHz operation in water, acoustic microscopy achieves spatial resolution similar to optical microscopy. Using an acoustic imager, we have seen quartz grains, which are fairly coarse in the range of 50 to 250 microns, revealing well-defined boundaries. In this case, the acoustic image may show a better contrast than the optical image. Surface roughness can have a significant negative effect on the reflectivity image and accurate inversion of true acoustic impedance:

EXAMPLE

Below, we describe experimental investigation of texture imaging while sampling mud filtrate through a 1 cm diameter probe pressed against a rock surface. We have found that qualitative predictions of the physical state of the mud cake can be made while the fluid mixture is withdrawn. The key idea is to show that stationary sampling provides mudcake removal and leaves only formation fluids (clear or opaque to the photodetector) between the rock sample and an array camera. Knowledge of the fluid states and mudcake removal process in the probe will provide the necessary information for the design of the optical hardware necessary to image formation rock surfaces.

Figure 5:
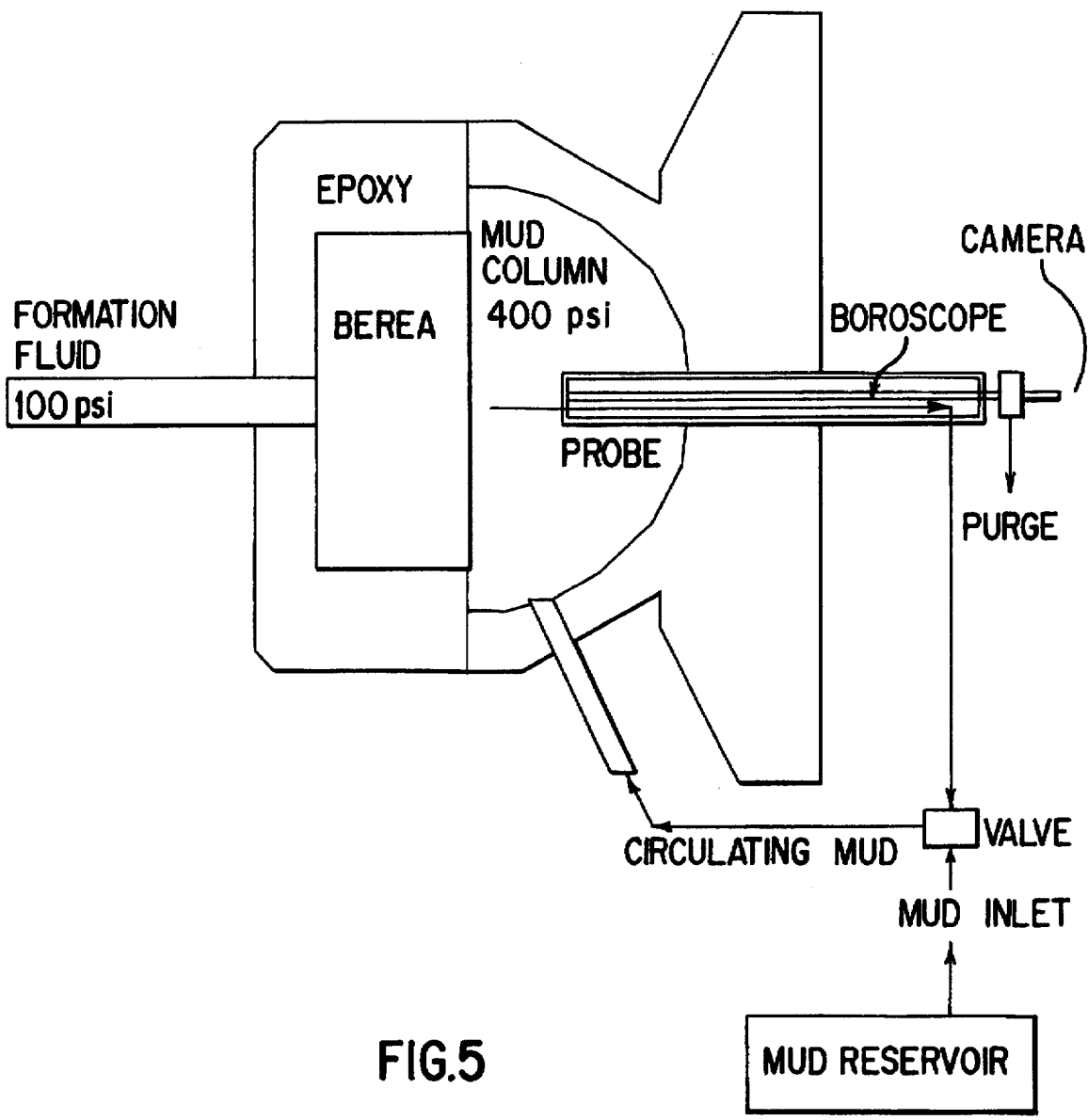
FIG. 5 shows an experimental set-up.

FIG. 5 shows a pressure cell and schematic of the experimental setup. Experiments were carried out in an X-ray transparent cell made of plexiglas and epoxy and rated at 400 psi. The porous solid was a Berea sandstone with a 100 md permeability and a 0.18 porosity. The rock sample was 10×10×5 cm and each flat face of the sample was sealed with epoxy. The one surface exposed to fluids was left unsealed. A curved plexiglas chamber which extended over the entire surface, was attached to one end. The chamber contained mud and was maintained at hydrostatic pressure so that a mudcake could form. A 1 cm diameter tube which served as a probe, was mounted at the center of the vessel as indicated FIG. 5. An actuator (not shown in FIG. 5) was used to slide and set the probe against the rock surface. An opening in the epoxy on the other face of the rock opposite to the probe is also visible in the CT scanner X-ray attenuation image of the pressure cell setup. It provides a communication path for the mud filtrate between the rock formation fluid and a reservoir.

For imaging purposes, a Titan G series miniature 4 mm diameter boroscope, with a 365 mm length, was inserted into the probe. The horoscope is made of a series of miniature lens utilizing a rod-lens relay concept. Such a system of relay lenses is effective when it is desired to carry an image through a relatively long distance and the available space limits the diameter of the lenses which can be used. The illumination uses cold light fibre-optic: the light is brought to the front of the boroscope by a series of glass fibres completely surrounding the front objective lens which allows the light source to be located away from the boroscope. The intensity of light was controlled by a rheostat to maximize light output. The optical assembly was mounted inside the probe with the focusable eyepiece isolated from the fluid by a set of pressure seals.

Figure 6B:
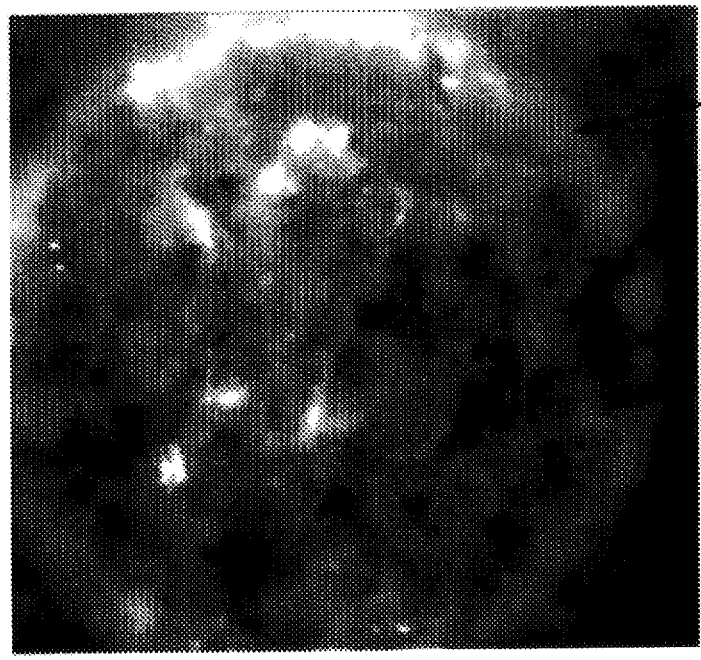
Figure 6B:

FIG. 6 shows a comparison between a) an optical image acquired with a Titan boroscope and its internal fiber-optics illumination and b) the same image acquired with an external light source. FIG. 6a shows the microscopic image of the berea rock surface. The light ring is due to an internal reflection at the inner wall of the high pressure window. The light can be brought to the front of the boroscope from a point to its side with a a proper angle to avoid this reflection as indicated by FIG. 6b.

The focusing eyepiece on the boroscope was combined with a video adapter to accommodate a video CCD camera. For our application, we used a SONY XC-75 with a CCD composed of 768×494 effective picture elements (horizontal/vertical) which correspond to a cell size (or pixel) of 8.4×9.8 microns. The output of the camera consisted of a horizontal resolution of 570 TV lines with 485 vertical effective lines. The Neotech Image Grabber hardware allows one video image to be grabbed and saved; the resulting image data is a disk file composed of 640×480 pixels (NTSC format) and 256 grey levels per pixels (8 bits). FIGS. 4a–4b, 6a–6b, 7d–7f, and 8a–8b are digitized outputs at different magnification from this system.

The mud used was a conventional dispersed bentonite water base mud maintained at approximately a pH of 10 by the addition of caustic soda, dispersed with the proprietary agent New-thin made by Milchem. One batch of mud was prepared for these experiment in a 40 liter vessel using cold tap water. Bentonite was added to a caustic soda solution to a concentration of 65 g/l with a few drops of New-thin deflocculating agent. The biocide Aquatreat DNM-30 was also added. The whole mixture was agitated for about four hours with a high shear Silverson mixer. The mud was allowed to hydrate and the pH was adjusted. The mud was left to age overnight and was used for several experiments over a period of one month. This method of preparation gives reasonable reproducible mud theology.

After mounting the epoxied rock sample onto the filtration cell, the apparatus was pressurized by compressed nitrogen fed to a mud reservoir of 2 liter total capacity. A maximum working pressure of 400 psi was achieved due to the pressure cell rating. A schematic of the mud circulation set-up is also shown in FIG. 5. Mud is flooding from the reservoir to the cell through an opening on the side of the pressure chamber and is driven out of the cell through the probe. A set of valves allows to fill the cell and evacuate the mud through the probe. Mud cake build up at the rock interface occurred under static filtration while the system was shut in with a constant pressure of 400 psi in the accumulator. The estimated post mortem filter cake thickness was 15 mm.

Preparation for the experiment began by saturating the epoxied Berea rock sample with distilled water. This was done under vacuum in a tank, resulting in the sample being fully immersed in water. The pressure cell was then assembled after positioning the sample and mud started to be injected through the tubing and circulated through the probe. Due to the mud reservoir maintaining the mud column pressure at a constant 400 psi and no resistive pressure in the rock sample, a mudcake formed at the rock interface. Filtrate fluid loss was collected for 27 hours. Then the rock sample pressure was raised to 100 psi by connecting a pressurized tank filled with distilled water while maintaining the mud column at 400 psi, leaving the static mudcake in place between the rock sample and the mud column.

Figure 7A:
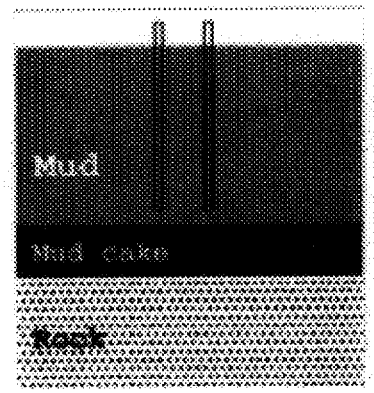
FIGS. 7a–c illustrate engagement of a probe with a rock surface.
Figure 7D:
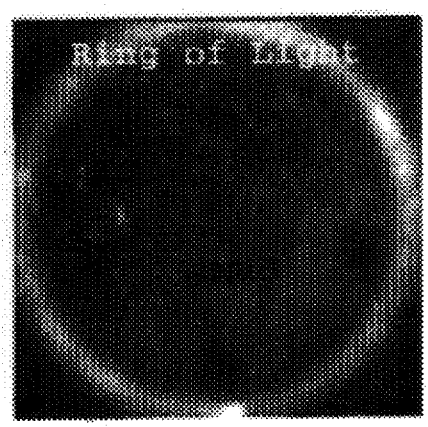
FIGS. 7d–f show the corresponding digital video images.
Figure 7B:
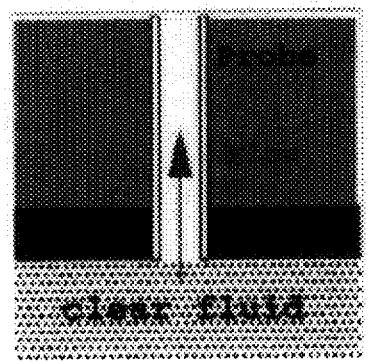
Figure 7E:
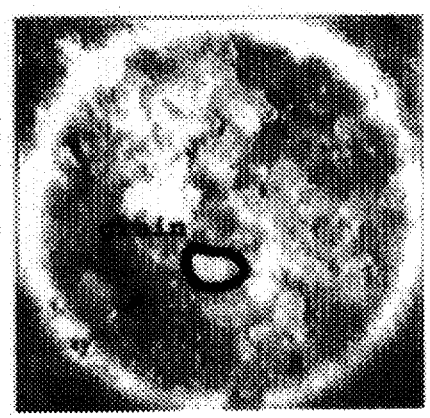
Figure 7C:
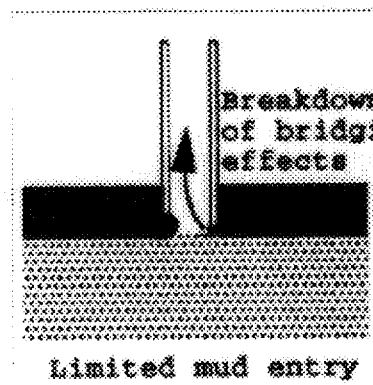
Figure 7F:
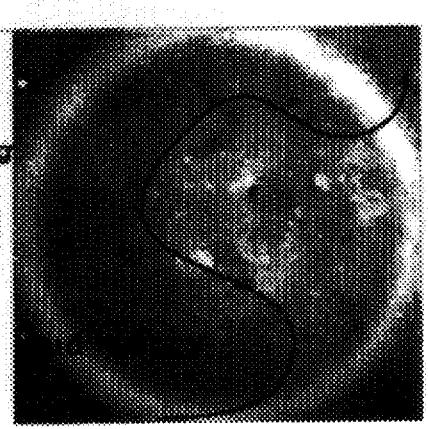

FIG. 7a–f are schematics (a–c) of three different experimental conditions with the corresponding digital video images (d–f). The mud is opaque in the visible range (FIGS. 7l and 7d)and the grains are visible when the formation fluid is clear (FIGS. 7b and 7e). During the imaging experiment, a sequence of images was collected as the actuator was used to position the probe until it touched the surface of the rock sample. FIG. 7a shows a schematic of the probe in communication with the mud and FIGS. 7d shows the associated frame of the digitized video signal. As expected, the image is opaque. When the probe was brought in contact with the rock surface, (FIG. 7b), a communication path was established with the formation fluid. To remove the mudcake and clear the internal part of the probe, the purge located at the other end of the probe was open to atmospheric pressure. The rock sample was maintained at a pressure of 100 psi, allowing formation fluid to flow.

In this example, we found it was not necessary to use a sealing packer or sealing pad to isolate an interval of a formation. To prevent the surrounding mud fluid, at 400 psi, from flooding the probe, we relied on the bridging and clogging effect of the small particles suspended in the fluid to create the hydraulic seal between the probe and the formation (FIG. 7b & c). For the clogging ability of the mud fluid particles to effectively isolate the interior of the probe, the gap between the tip of the probe and the formation wall must be calculated to be smaller than a specified value which depends on the size of the largest particle in the fluid. The resulting seal created by this clogging effect eliminates the need to mount a packer seal around the tip of the probe. Furthermore, replacing a packer-probe assembly by a stand alone probe provides an experimental simplification depending on the roughness of the rock sample. It has been shown that a set of particles in the size range 0–12 microns could bridge (clog) gaps with widths of about 30 times the largest particle size assuming that there is approximately a 10% volume fraction of solids in the mud fluid. For a particle size range of 150–200 microns, the gap width that can be clogged reduces to about 4 or 5 times the size of the largest particle size. The maximum gap possible between the probe tip and the well bore wall depends on these criteria. The particle size distributions of five typical drilling muds by MudTech vary from 1 micron, which is typical for bentonite particles, to 200 micorns. Since drilling fluids contain particles as large as 200 microns (drilling cuttings may be larger), the gap between the tip of the probe and borehole wall can be on the order of one-half millimeter. If the gap is too wide, mud invades the probe and prevents imaging of the rock surface.

Refer to FIG. 7b showing a schematic of the experimental condition. Filtrate and formation fluids are sampled under a 100 psi differential pressure by opening the purge mounted on the back of the probe shown FIG. 5 while the probe is set against the rock formation. This pressure differential causes the break down of the mudcake seal. Providing that clogging effects at the sampling probe exist, the digital video image of the rock wall shown in FIG. 7e was unchanged for the duration of the sampling. This experiment was successfully carried out several times with the same rock sample, but different muds.

Figure 8A:
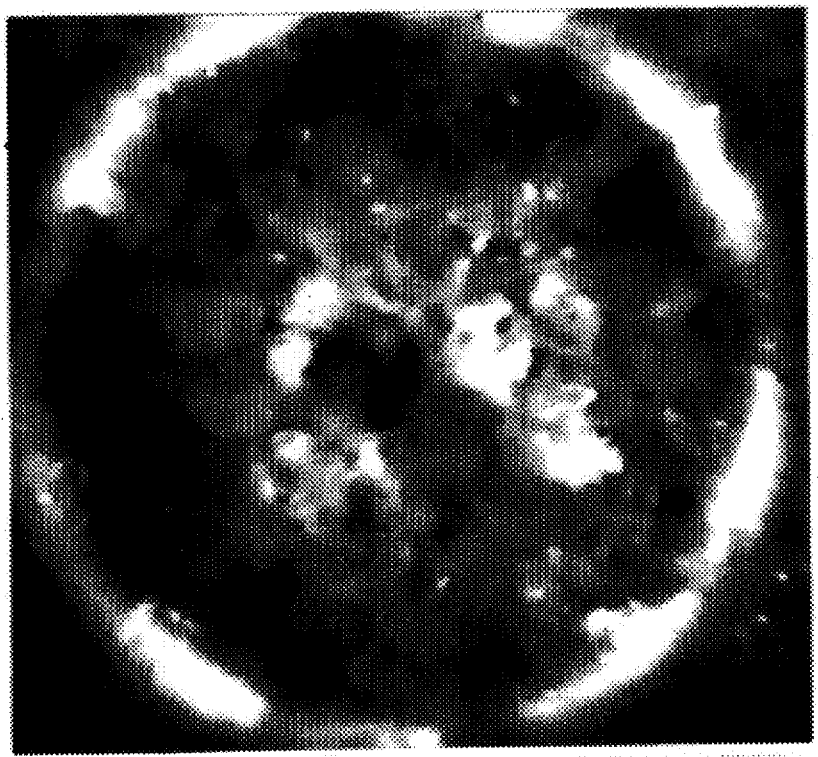
FIGS. 8a–b show microscopic images of berea sandstone with two muds.
Figure 8B:
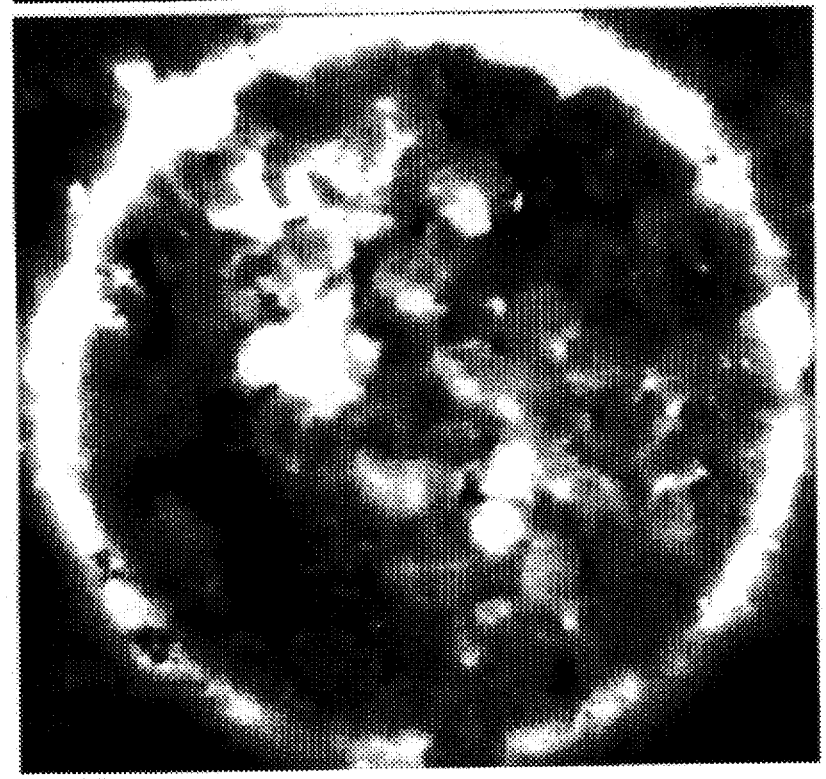

FIG. 8a and 8b shows digital images of berea sandstone gains while experimenting with two distinct muds. The probe is in contact with the rock sample while the bridging effect seals off the mud and the mud cake is moved by filtrate fluid. These experiments produced images similar in quality to those of FIG. 8a and 8b. That is a clear indication that the entire probe area was open to flow, that clogging effects indeed sealed off the mud and that the mudcake could be cleaned up with at least 100 psi differential pressure. It also demonstrates that individual grains which composed the rock surface are clearly visible.

DATA TRANSMISSION

A typical single-frame, digitized image of a CCD video camera corresponds to 640×480 pixels with 8-bit depth, consuming just under 2.5 Mbits of memory. This large volume of data greatly reduces data transmission speed. Telemetry allows transmission of about 500 kbits/sec. Thus, it may be necessary to use data compression to transmit all the pixels for processing on the surface. The most efficient form of compression involves computing the final grain size downhole and then transmitting it uphole. See U.S. Pat. application Ser. No. 250,196 to Auzerais et al. filed 27 Aug. 1994, for example, for a description of stereo and morphological algorithms.

Data compression methods include two major schemes: lossless compression and lossy compression. On one hand, lossless compression reduces some amount of the data, but reconstructs the original data. Lossless compression is used in compressing ASCII text, for example. On the other hand, lossy compression provides an acceptable approximation of the original data with compression rates an order of magnitude greater than those of lossless compression. For still images, commercially available compression algorithms exist such as Px64, CIF, or JPEG [ISO/IEC DIS 10918-1, Digital compression and coding of continuous-tone still image, January 1992.]. For moving images, commercially available compression algorithms also exist, such as MPEG [Quinnell, R. A., Image compression-Part 2, EDN, pp. 120, March 1993.].

We have described the imaging of borehole walls on a microscale to reveal grain structure of a formation, for example. Borehole casings can also be imaged. We have described imaging of these borehole surfaces through not only clear formation fluids, but through opaque formation fluids also. Such imaging has wireline, logging-while drilling, coiled-tubing drilling, and production logging applications.

We claim:

1. A borehole tool for obtaining data concerning formation properties comprising, a means for isolating an interval of the formation from borehole fluids beyond the interval;

a means for drawing formation fluid from the isolated interval of the formation;

a means for producing wave energy which reflects from the isolated interval and which is received by the tool, said wave energy passing through said drawn formation fluid, and a means for producing data representative of a property of a portion of the isolated interval based on the received wave energy.

2. The tool of claim 1, wherein the signal is a two-dimensional representation of rock texture of the formation.

3. The tool of claim 2, including a detector including InGaAs for receiving the wave energy which reflects from the isolated interval.

4. The tool of claim 3, wherein the means for drawing formation fluid comprises a nozzle for placement adjacent the formation such that substantially formation fluid flows through the nozzle.

5. A method of using a downhole tool in a borehole to obtain data concerning formation properties, the steps comprising, isolating an interval of the formation from borehole fluids beyond the interval;

drawing formation fluid from the isolated interval of the formation;

producing wave energy which passes through said drawn formation fluid and reflects from the isolated interval and receiving the energy with the tool; and producing signals based on the received wave energy, said signals comprising data representing a property of a portion of the isolated interval with the tool.

6. The method of claim 5, wherein the signal represents rock texture of the formation.

7. The method of claim 6, including receiving the wave energy which reflects from the isolated interval with a detector of InGaAs.

8. The method of claim 7, including drawing formation fluid with a nozzle placed adjacent the formation such that substantially formation fluid flows through the nozzle.

9. An apparatus for characterizing properties of an earth formation comprising,
- a means for obtaining through formation fluids drawn from an isolated region a first signal comprising a two-dimensional representation of a portion of a formation, wave energy having been reflected off the portion of the formation to produce the first signal; and
- a means for characterizing a formation property based on the first signal.

10. The apparatus of claim 9, the first signal indicating rock texture of the formation.

11. The apparatus of claim 10, wherein the wave energy comprises visible light.

12. The apparatus of claim 10, wherein the wave energy comprises near infrared light.

13. The apparatus of claim 10, wherein the wave energy comprises ultrasonic energy.

14. A method of characterizing properties of an earth formation, the steps comprising,
- obtaining a first signal comprising a two-dimensional representation of a portion of a formation through formation fluid drawn from an isolated zone, wave energy having passed through the drawn formation fluid and been reflected off the portion of the formation to produce the first signal; and
- indicating a characterization of a formation property based on the first signal.

15. The method of claim 14, including indicating rock texture of the formation.

16. The method of claim 15, wherein the wave energy comprises visible light.

17. The method of claim 15, wherein the wave energy comprises near infrared light.

18. The method of claim 15, wherein the wave energy comprises ultrasonic energy.

19. A downhole tool for obtaining data concerning formation properties comprising,
- a sampling means having an inlet for providing fluid communication between the formation and the interior of the tool;
- a seal mounted adjacent the inlet to isolate an interval of the formation from borehole fluids located beyond the seal;
- a pump for drawing fluid from the formation through the inlet of the sampling means; and
- means for producing a signal comprising a two-dimensional representation of a portion of the isolated interval of the formation.

20. The tool of claim 19, including a means for reflecting wave energy from the portion of the isolated formation.

21. The tool of claim 20, including a detector of InGaAs for receiving the wave energy which reflects from the isolated portion of the formation.

22. The tool of claim 21, wherein the pump for drawing fluid comprises a nozzle for placement adjacent the formation such that substantially formation fluid flows through the nozzle.

23. The tool of claim 20, wherein the wave energy comprises visible light.

24. The tool of claim 23, wherein the representation is an image which indicates rock texture.

25. The tool of claim 20, wherein the wave energy comprises near infrared light.

26. The tool of claim 25, wherein the representation is an image which indicates rock texture.

27. The tool of claim 20, wherein the wave energy comprises ultrasonic energy.

28. The tool of claim 27, wherein the representation is an image which indicates rock texture.

29. The method for obtaining data concerning formation properties using a downhole tool comprising,
- providing fluid communication between the formation and the interior of the tool through an inlet to a sampling means of the tool;
- isolating an interval of the formation from borehole fluids located beyond the interval with a seal mounted adjacent the inlet;
- drawing fluid, with a pump, from the formation through the inlet of the sampling means; and
- producing a signal comprising a two-dimensional representation of a portion of the isolated interval of the formation.

30. The method of claim 29, including reflecting wave energy from the portion of the interval to produce the signal.

31. The method of claim 30, including receiving the wave energy which reflects from the portion of the interval with a detector of InGaAs.

32. The method of claim 31, including drawing formation fluid with a nozzle placed adjacent the formation such that substantially formation fluid flows through the nozzle.

33. The method of claim 30, including reflecting wave energy which comprises visible light.

34. The method of claim 33, wherein the representation is an image which indicates rock texture.

35. The method of claim 30, including reflecting wave energy which comprises near infrared light.

36. The method of claim 35, wherein the representation is an image which indicates rock texture.

37. The method of claim 36, including reflecting wave energy which comprises ultrasonic energy.

38. The method of claim 37, wherein the representation is an image which indicates rock texture.

39. An apparatus for indicating a property of a formation comprising,
- a means for producing substantially near infrared (NIR) light such that the NIR light passes through opaque formation fluid in a borehole to illuminate a surface in the borehole;
- a means for receiving the NIR light which reflects from the surface in the borehole and through the opaque formation fluid;
- a means for producing a signal in response to the received NIR light, the signal comprising a two-dimensional representation of the surface in the borehole and indicating a property of the formation.

40. The apparatus of claim 39, including a detector of InGaAs for receiving the NIR light which reflects from the surface.

41. The apparatus of claim 40 including a means for drawing fluid from a surface defining the borehole and comprising a nozzle for placement adjacent the surface such that substantially formation fluid flows through the nozzle.

42. The apparatus of claim 41, wherein the signal indicates rock texture of the formation.

43. A method for indicating formation properties using a borehole tool positioned in a borehole which contains formation fluid, the steps comprising, producing with the borehole tool substantially near infrared (NIR) light such that the NIR light passes through the opaque formation fluid and illuminates a surface in the borehole;

receiving with the borehole tool NIR light which reflects from the surface in the borehole and through opaque formation fluids;

producing with the tool a signal based on the received NIR light, the signal comprising a two-dimensional representation of the surface in the borehole and indicating a property of the formation.

44. The method of claim 43, including receiving the reflected NIR light from the surface with a detector of InGaAs.

45. The method of claim 44, including drawing formation fluid with a nozzle placed adjacent the formation such that substantially formation fluid flows through the nozzle.

46. The method of claim 45, including indicating rock texture of the formation with the signal.

* * * * *

UNITED STATES PATENT AND TRADEMARK OFFICE
CERTIFICATE OF CORRECTION

PATENT NUMBER: 5,663,559

ISSUED: September 2, 1997

NAME OF PATENTEE Auzerais et al.

TITLE OF INVENTION: MICROSCOPY IMAGING OF EARTH FORMATIONS

It is certified that an error appears in the above-identified patent and that said Letters Patent is hereby corrected as shown below:

Cover Sheet, Inventors, "Robert L. Schroeder" should read -- Robert J. Schroeder --.

Signed and Sealed this

Seventeenth Day of November, 1998

*Attest:*

BRUCE LEHMAN

*Attesting Officer*     *Commissioner of Patents and Trademarks*